Patented Nov. 22, 1949

2,489,238

UNITED STATES PATENT OFFICE 2,489,238

DEBENZYLATION OF BENZYLATED IMIDAZOLIDO-THIOPHANE COMPOUNDS

Moses Wolf Goldberg, Upper Montclair, and Leo Henryk Sternbach, Montclair, N. J., assignors to Hoffmann-La Roche Inc., Roche Park, Nutley, N. J., a corporation of New Jersey No Drawing. Application June 8, 1948, Serial No. 31,846

9 Claims. (Cl. 260—309)

The present invention relates to the debenzylation of N-benzylated imidazolido-thiophanes, and more particularly such compounds which can be represented by the following formulae:

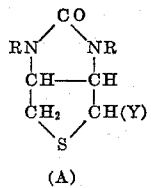 and 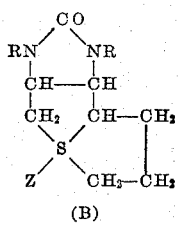

(A)            (B)

wherein R stands for hydrogen and benzyl, at least one R being benzyl; Y stands for an ω-substituted alkyl radical, as for example, ω-lower alkoxy-alkyl, ω-halogen-alkyl, ω-cyano-alkyl, ω-carboxy-alkyl, and ω-malonyl ester-alkyl [alkyl-CH(COOAlkyl)₂], and Z stands for an anion, as for example, halogen.

The compounds represented by Formulae A and B, are new compounds and are intermediates in the production of biotin and homologs of biotin. The compounds and their mode of manufacture are described in our copending applications Serial No. 673,642, filed May 31, 1946, Serial No. 763,446 and Serial No. 763,447, filed July 24, 1947.

In the aforesaid applications, the debenzylation of compounds of Formula A is carried out with sodium and liquid ammonia.

According to the present invention, N-benzylated imidazolido-thiophanes in general, and of Formulae A and B in particular, can be readily debenzylated with aqueous, preferably concentrated, solutions of halogen acids, such as hydrochloric, hydriodic, and hydrobromic acid. Debenzylation can also be carried out with anhydrous aluminum chloride.

The main products resulting from the new debenzylation method are debenzylated 2-keto-imidazolido-thiophanes. Thus, the treatment of mono- or dibenzyl-biotin with the concentrated halogen acids, or aluminum chloride, gives biotin in good yield. When the dibenzyl-(2'-keto-imidazolido)-thiophanes are debenzylated, the corresponding mono-benzylated, as well as completely debenzylated compounds, can be obtained. Hydrobromic acid is the preferred debenzylating agent, since good yields are obtained and the reaction is readily carried out. When a compound of Formula A, Y in the formula being an ω-malonyl ester-alkyl radical, as for example, 3,4-(1',3'-dibenzyl-2'-keto-imidazolido) - 2 - (ω,ω-dicarbethoxy-butyl)-thiophane, is heated with concentrated hydrobromic acid, saponification, decarboxylation and debenzylation of this compound is achieved in one operation with the direct formation of biotin. This represents a considerable simplification of the process described in our application Serial No. 763,446 where three separate operations are required to obtain biotin from the above-mentioned dicarbethoxy compound.

In the debenzylation reaction with halogen acids, varying amounts of the debenzylated 3,4-(2'-keto-imidazolido)-thiophane formed may be split to the corresponding 3,4-diamino-thiophane, which can be easily reconverted by reaction with phosgene to the said imidazolido-thiophane. For example, when 3,4-(1',3'-dibenzyl-2'-keto-imidazolido)-2-(ω,ω - dicarbethoxy - butyl)-thiophane is converted by hydrobromic acid to biotin, part of the biotin formed is split to give 3,4-diamino-2-(ω-carboxybutyl)-thiophane, which is easily converted to biotin by treatment with phosgene in alkaline solution.

In general, the ω-substituent in the side chain of compounds of Formula A, when reactive to the halogen acids employed in the debenzylation reaction, can undergo secondary reactions. For example, if the ω-substituent is an alkoxy radical, it can be converted into a halogen radical.

Our new debenzylation process provides better overall yields as compared with the debenzylation process in liquid ammonia with sodium. The reactions are more readily carried out and simpler equipment is required. All of these advantages result in considerable reduction in costs.

The following scheme will serve to represent the reactions involved in our new debenzylation process:

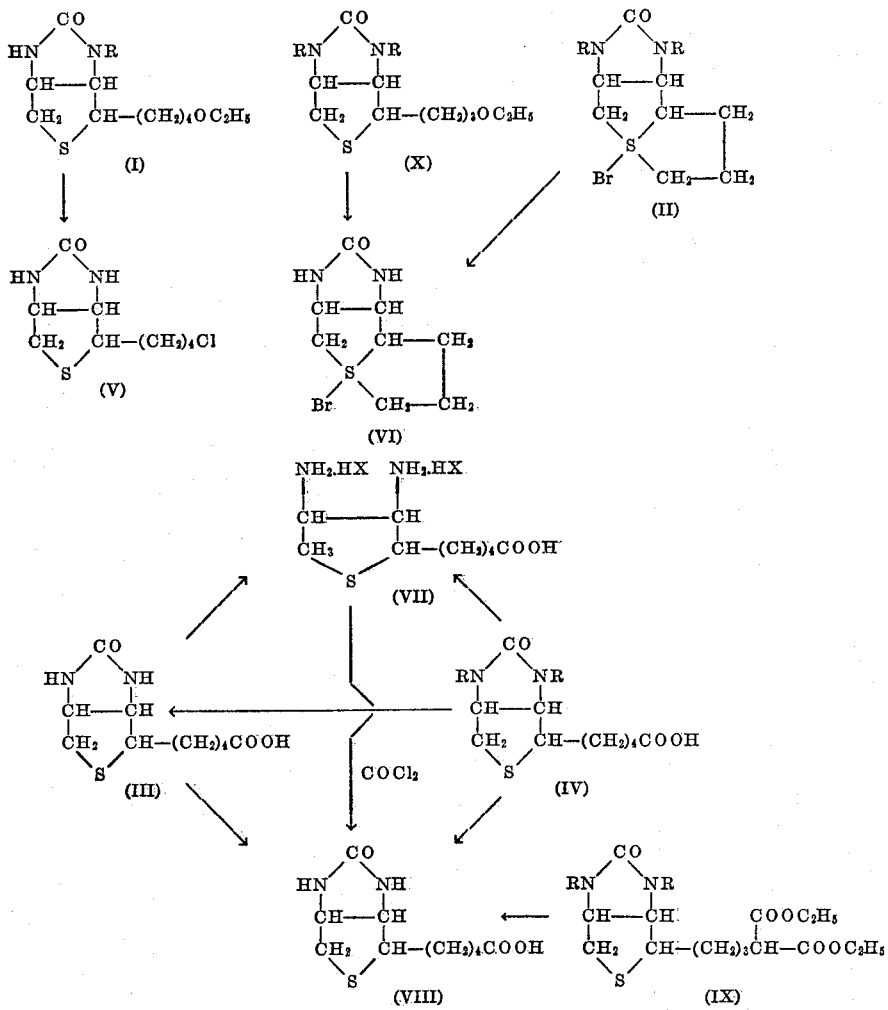

R=CH₂C₆H₅
X=Cl, Br

The following examples will serve to illustrate our invention:

EXAMPLE 1

*Debenzylation of 3,4-(N-monobenzyl - 2' - keto-imidazolido) -2-(ω-ethoxy - butyl) - thiophane (I) with hydrochloric acid*

A mixture of 1 gram of 3,4-(N-monobenzyl-2'-keto-imidazolido) -2-(ω-ethoxy-butyl)-thiophane (I), 4 cc. of acetic and 10 cc. of concentrated hydrochloric acid is heated in a closed tube for 24 hours to 105° C. The mixture is diluted with water, purified with activated charcoal, filtered and concentrated to a small volume. Ethanol and ether are added causing the precipitation of small clusters of needles. The product is filtered off and recrystallized several times from a mixture of methanol, acetone and ether, forming crystals melting at 216–217° C. of compound (V). In this case, in addition to debenzylation, the ethoxy group is replaced by a chlorine atom.

EXAMPLE 2

*Debenzylation of 3,4 - (1',3' - dibenzyl - 2' - keto-imidazolido) - 1,2 - trimethylene - thiophanium bromide (II)*

A mixture of 4 grams of the cyclic thiophanium bromide (II) and 50 cc. of 48 per cent hydrobromic acid is refluxed for five hours. The formation and separation of the oily benzylbromide can be observed during this reaction. The benzylbromide is removed by ether extraction and the almost colorless aqueous solution is concentrated in vacuo. Absolute alcohol is added to the residue and the precipitated crystals are filtered off after a few hours, M. P. 190–197° C. The debenzylated compound (VI) is recrystallized repeatedly from methanol, forming finally prisms melting at 203.5–204.5° C. It is a new compound and forms part of our invention.

EXAMPLE 3

*Debenzylation of 3,4 - (1',3' - dibenzyl - 2' - keto-imidazolido) -2-(ω - ethoxypropyl) - thiophane (X)*

A mixture of 10 grams of compound (X) and 100 cc. concentrated (48 per cent) hydrobromic acid is stirred and refluxed for five hours. The mixture is then diluted with water and extracted with benzene. The aqueous acid solution is treated with some activated charcoal, filtered and concentrated in vacuo. The residual syrup is dissolved in a hot mixture of methanol and ethanol. The reaction product precipitates after a few hours. It is filtered off and recrystallized from methanol, forming prisms melting at 203.5–204.5° C.

In this debenzylation reaction there occurs also a replacement of the ethoxy group by bromine, and the final reaction product is the cyclic thiophanium compound (VI).

EXAMPLE 4

Debenzylation of l-dibenzyl-biotin (IV)

A. 10 grams of crude l-dibenzyl-biotin is refluxed for 2½ hours with 100 cc. of 48 per cent hydrobromic acid. The cooled reaction mixture is extracted with benzene, to remove the benzylbromide and some impurities, and is then concentrated in vacuo to dryness. The residue is dissolved in boiling water, filtered and stirred till the temperature falls to 50–60° C., then some chloroform is added to dissolve all of the partly debenzylated material and the stirred mixture is cooled to 0° C. The precipitated product is filtered off. It is identical in every respect with d-biotin. The chloroform solution contains d-monobenzyl-biotin, which can be debenzylated again by treatment with hydrobromic acid. The aqueous liquors from the biotin crystallization contain some diamino acid (VII), which can be reconverted into d-biotin by concentrating the solution to dryness and treating the residue with alkali and phosgene.

B. 4 grams of crude l-dibenzyl-biotin is heated on the steam bath for eight hours with 40 cc. of 55–57 per cent hydriodic acid. The mixture is concentrated in vacuo, treated with hot water and extracted with chloroform. The aqueous solution is concentrated in vacuo to a small volume and the precipitate formed is recrystallized from hot water with the addition of some chloroform. The aqueous layer yields d-biotin, while d-monobenzyl-biotin is isolated from the chloroform solution.

C. A mixture of 2.2 grams of crude l-dibenzyl-biotin, 2.4 grams of anhydrous aluminum chloride and 30 cc. of chlorobenzene is heated for two hours to 120° C. Water and some dilute hydrochloric acid are added, and the chlorobenzene layer is separated. The aqueous part is extracted with chloroform to remove all nondebenzylated material, and is then concentrated in vacuo to a small volume. The solution is cooled to 0° C. for several hours and the precipitated product is filtered off. It is in every respect identical with d-biotin.

EXAMPLE 5

Direct conversion of l-3,4-(1',3'-dibenzyl-2'-keto-imidazolido)-2-(ω,ω-dicarbethoxy-butyl)-thiophane (IX) to d-biotin 65 grams of l-3,4-(1',3'-dibenzyl-2'-keto-imidazolido)-2-(ω,ω-dicarbethoxy-butyl)-thiophane (IX) are heated with 800 cc. of 48 per cent aqueous technical hydrobromic acid. A vigorous evolution of ethylbromide starts after the inside temperature has reached 90–100° C., and it is distilled off as it is formed. After 30 minutes the inside temperature rises to 125° C. and the distillate consists of ethylbromide and a few cc. of hydrobromic acid. The distillation is continued for ½ to 1 hour until 100–150 cc. of hydrobromic acid, containing varying amounts of oily benzyl bromide, have been distilled off. The mixture is then refluxed another 2½ to 3 hours for a total of 3½ hours at 120–126° C. It is then concentrated to dryness in vacuo (inside temperature 60° C.).

To the oily residue are added 1.8 liters of boiling water. The mixture is boiled for 10 minutes. The aqueous solution is then poured off from the oily, insoluble material which adheres to the flask. The solution is cooled down to 54° C., and the precipitated d-monobenzyl-biotin (prisms from dioxane melting at 181–182° C. corrected), is filtered off. It is combined with the dark chloroform- or dioxane-soluble material remaining in the flask, and is again debenzylated. To the aqueous solution are added 200 cc. of chloroform and the mixture is stirred and cooled for two hours. It is then left for 24 hours at 0° C. The precipitated crude biotin is filtered off, the chloroform solution is separated and the aqueous solution is concentrated to a small volume and cooled to 0° C. yielding some more biotin. The d-biotin thus obtained is recrystallized once from 1790 cc. of boiling water with the addition of 1.0 gram of activated carbon and yields chemically pure d-biotin having a specific rotation of +92.7° (2 per cent solution in 0.1 N NaOH) and a melting point of 230–231° C. (corrected).

The aqueous mother liquor remaining after separation of the second biotin crop from the reaction medium contains some dihydrobromide of the diamino acid (VII) which can be reconverted to biotin by treatment of phosgene in alkaline solution.

EXAMPLE 6

Debenzylation of d.l-monobenzyl-biotin

A mixture of 1 gram of d.l-monobenzyl-biotin (III), 4 cc. of acetic acid and 10 cc. of concentrated hydrochloric acid is heated for 24 hours to 108–115° C. in a closed tube. The brown reaction mixture is diluted with water, activated charcoal is added and the mixture is filtered. The aqueous solution is extracted with ether, and concentrated in vacuo. To the crystalline residue a small amount of methanol is added, followed by some ethanol and ether. The crystalline precipitate is filtered. It is recrystallized several times from a mixture of methanol, actone and ether, forming needles melting at 220–221° C. The compound obtained is the dihydrochloride of d,l-cis-3,4-diamino-2-(ω-carboxy-butyl)-thiophane (VII). In this case, debenzylation and splitting of the imidazolidone nucleus occurs. The compound can be easily converted to d.l-biotin by reacting it with phosgene in the presence of alkali, as for example, in the following manner.

To a cooled solution of 80 mg. of the diamino-dihydrochloride (VII) and 0.8 gram of sodium carbonate in 10–20 cc. of water, a xylene solution of phosgene is added in small portions until the mixture becomes strongly acid. The solution is then concentrated in vacuo and cooled to +5° C. After 20 hours, some precipitated impurities are filtered off, and the solution is cooled to +5° C. for 48 hours. d.l-biotin precipitates in clusters of needles and is filtered off.

In general any of the N-benzylated imidazolido-thiophanes of Formulae A and B in optically active or inactive form can be debenzylated according to the invention in the manner herein described to form the corresponding debenzylated imidazolido-thiophanes. The N-benzylated imidazolido-thiophanes employed as starting materials can be prepared in the following manner:

1,3-dibenzyl-imidazolidone-(2)-cis-4,5-dicarboxylic acid and its anhydride

To a stirred, ice cooled solution of 648 grams (1.98 moles) of bis-benzylaminosuccinic acid in 2 liters 3 N potassium hydroxide, are added in small portions (within 1½ hours) 1.6 liters of a 3.75 molar solution of phosgene in xylene (=6 moles COCl₂) and 2.7 liters 6 N potassium hydroxide (=14 moles). The mixture is then acidified with concentrated hydrochloric acid, and the formed precipitate filtered off and washed with water. The precipitate is then washed thoroughly with hot alcohol, and the aqueous filtrate is extracted several times with ethyl acetate. The alcoholic solution and the ethyl acetate extract contain all the imidazolidone-dicarboxylic acid formed. The alcohol insoluble part of the precipitate is pure starting material (220 grams=0.65 moles). The alcoholic and ethyl acetate solutions are taken to dryness, and the residue is refluxed with benzene until it becomes completely crystalline. The cooled mixture is filtered; the main part of the dibenzyl-imidazolidone-dicarboxylic acid remains on the funnel (283 grams=0.8 moles). It can be recrystallized from ethyl acetate. Prisms, melting first at 167° C., then resolidifying again and melting at 236° C.

The benzene mother liquor is concentrated in vacuo, and the rest of the reaction product is isolated in form of its anhydride in the following way: The oily residue is refluxed with acetic anhydride, then the mixture is concentrated and benzene is added. The anhydride formed crystallizes in nice needles. Melting point 236–237° C.

*Acetate of the cyclic form of 1,3-dibenzyl-cis-4-carboxy - 5 - formyl-imidazolidone-2,3,4-(1',3'-dibenzyl - 2' - keto-imidazolido)-2-keto-5-acetoxy-tetrahydrofuran*

A mixture of 100 grams of the anhydride of 1,3 - dibenzyl - imidazolidone-cis-4,5-dicarboxylic acid, 150 grams zinc dust, 100 grams zinc powder (40 mesh), 1500 cc. acetic anhydride and 500 cc. acetic acid is stirred and refluxed for 10–15 hours. The dicarboxylic acid can be used instead of the anhydride. In that case the acid is first mixed with the acetic anhydride, refluxed for 10 minutes and then the other constituents are added. The amounts of acetic acid and anhydride can be reduced to about ½ without affecting the yield. If too little is used, the yield is reduced. After that time, the mixture is cooled, filtered and the precipitate on the funnel washed with ethyl acetate. The filtrate is concentrated in vacuo, and the oily or partly crystalline residue is treated with ice water and ethyl acetate, until all the organic substance is dissolved. The ethyl acetate layer is washed with water, dried with sodium sulfate and concentrated in vacuo. The oily or partly crystalline residue is boiled up with acetic anhydride, in order to reconvert any of the compound decomposed during the treatment with water into the cyclic acetate. The mixture is again concentrated in vacuo. Xylene is then added to the residue, and part of it is distilled off in vacuo, then ether and petrol-ether are added. The reaction product separates in fine needles or prisms, which melt at 103–104° C. After drying, the melting point is 124–125° C.

*1,3-dibenzyl-cis-4-carboxy-5-formyl-imidazolidone-2*

An excess of 3 N sodium hydroxide solution is added to a solution of the acetate of the cyclic form of 1,3-dibenzyl-cis-4-carboxy-5-formyl-imidazolidone-2 in dioxane. After 2 minutes the mixture is acidified with dilute sulfuric acid and extracted with ether. The ether extract is washed, dried with sodium sulfate, and concentrated in vacuo. The residue is recrystallized from a mixture of acetone, ether and petrol-ether.

The free aldehydo acid crystallizes in colorless needles or prisms melting at 109–110° C. It forms a 2,4-dinitrophenylhydrazone, which crystallizes from a mixture of dioxane, benzene and petrol-ether in orange prisms melting at 223.5–224.5° C.

The free aldehydo acid can be reconverted into the acetate of the cyclic form by treating it with acetic anhydride or acetyl chloride.

*Thiolactone of 1,3-dibenzyl-cis-4-carboxy-5-mercaptomethyl - imidazolidone- 2 , 3,4-(1',3'-dibenzyl - 2'-keto-imidazolido)-2-keto-thiophane*

A. A vigorous stream of hydrogen chloride and hydrogen sulfide is passed through a suspension of 150 grams of the acetate of the cyclic form of 1,3 - dibenzyl - cis-4-carboxy-5-formyl-imidazolidone-2 in 850 cc. absolute alcohol cooled to −10 to −20° C. After about 1½ hours, most of the starting material is dissolved. To complete the reaction, hydrogen chloride and hydrogen sulfide are passed through the solution for another hour. The solution is then concentrated in vacuo, at the lowest possible temperature and with exclusion of moisture. Some toluene is added to the residue and distilled off in vacuo, thus removing most of the hydrogen chloride still present.

B. A vigorous stream of hydrogen chloride and hydrogen sulfide is passed through a solution of 150 grams of 1,3 - dibenzyl-cis - 4 - carboxy - 5-formyl- imidazolidone-2 in 850 cc. absolute alcohol cooled to −10 to −20° C. After 2½ hours the solution is concentrated in vacuo at the lowest possible temperature and with exclusion of moisture. Some toluene is added to the residue and distilled off in vacuo, thus removing most of the hydrogen chloride still present.

C. The residual oil from reaction A or reaction B is dissolved in 1200 cc. of a suspension of potassium hydrosulfide in alcohol. (This suspension is prepared by saturating a mixture of 672 grams potassium hydroxide and 4 liters of alcohol with hydrogen sulfide). The mixture is left at room temperature for 15 hours, then refluxed for one hour, poured on ice and acidified with dilute sulfuric acid. The organic part is extracted with ether, the solution is dried with sodium sulfate and concentrated in vacuo. The residue is reduced in a stirred refluxing mixture of 900 grams zinc dust, 150 grams granulated zinc (20 mesh) and 2.3 liters acetic acid. After 4 hours, the solution is filtered, and the mixture of zinc and zinc acetate remaining on the funnel is washed with ether and water. The filtrate is concentrated in vacuo and diluted with ether and 40 per cent sulfuric acid until clear separation takes place. The ether layer is separated, washed with water and concentrated in vacuo to a small volume. After 24–48 hours, the mixture becomes crystalline. It is then diluted with some more ether and filtered. Melting point 123–234° C.

The thiolactone can be recrystallized from a mixture of acetone, ether and petrol-ether. The pure compound forms colorless plates melting at 126–127° C. It is soluble in strong alkali, and gives a positive mercaptan test with sodium nitroprusside.

*3,4-(1',3'-dibenzyl-2'-keto-imidazolido)-2-hydroxy-2-(ω-ethoxypropyl)-thiophane*

A Grignard solution, prepared from 13.6 cc. of 3-ethoxypropyl-bromide and an excess of magnesium (4.8 grams) in 30 cc. of ether and 10 cc. of benzene, is diluted with benzene, decanted from the unreacted magnesium and added dropwise (in about 30 minutes) to a boiling, stirred solution of 27 grams of 3,4-(1',3'-dibenzyl-2'-keto-imidazolido)-2-ketothiophane (thiolactone) in 350 cc. of benzene. The solution is refluxed for another 3½ hours. The mixture is then decomposed with ice and dilute sulfuric acid, the organic layer is separated and concentrated in vacuo. The residue is dissolved in methanol and heated to 50° C. with an excess of aqueous sodium hydroxide solution. Ether and water are added, and the two layers are separated. The alkaline aqueous solution contains the unreacted thiolactone, which is extracted and recovered after acidification. The ether layer, containing the reaction product, is dried and concentrated in vacuo. The residue is crystallized from ether and petrol-ether.

The product is soluble in strong alkali and gives a positive mercaptan test with sodium nitroprusside. It can be recrystallized from a mixture of acetone, ether and petrol-ether. Prisms melting at 114.5–115.5°C. are obtained.

3,4-(1',3'-dibenzyl-2'-keto-imidazolido)-2-(ω-ethoxy-propylidene)-thiophane

A solution of 20.0 grams of 3,4-(1',3'-dibenzyl-2'-keto-imidazolido)-2-hydroxy-2-(ω-ethoxypropyl) thiophane in 100 cc. acetic acid is refluxed for 1½ hours. The solution is concentrated in vacuo, the residue is dissolved in ether and the solution is washed with dilute sodium carbonate solution. The ether solution is dried and concentrated in vacuo. The oily residue solidifies after a few hours. It can be recrystallized from petrol-ether and forms fine needles melting at 62.5–63.5° C.

3,4-(1',3'-dibenzyl-2'-keto-imidazolido)-2-(ω-ethoxypropyl)-thiophane

The crude 3,4-(1'3'-dibenzyl-2'-keto-immidazolido)-2-(ω-ethoxypropylidene)-thiophane (19 grams), obtained as described above, is dissolved in 150 cc. of methanol and hydrogenated in the presence of 4 grams of prehydrogenated palladium oxide at room temperature and atmospheric pressure. The calculated amount of hydrogen is taken up in about 30 hours. The catalyst is then filtered off, and the solution is concentrated in vacuo. The product solidifies after some time and is used in the crude form for the next step.

3,4-(1'3'-dibenzyl-2'-keto-imidazolido)-1,2-trimethylene-thiophanium bromide A solution of 5 grams of 3,4-(1',3'-dibenzyl-2'-keto-imidazolido)-2-(ω-ethoxypropyl)-thiophane in 50 cc. of an 18 per cent solution of hydrogen bromide in acetic acid is heated for three hours to 60° C. The solution is concentrated in vacuo, and treated with water and benzene. The mixture is cooled to +5° C. and the precipitated crystalline reaction product is filtered off and washed with benzene and cold water. A further amount of the product can be obtained by concentrating the aqueous part of the mother liquors (the benzene layer contains only impurities). The product can be recrystallized from water. Thick plates melting at 220–222° C. are obtained.

3,4-(1',3'-dibenzyl-2'-keto-imidazolido)-2-(ω,ω-dicarboxy-butyl)-thiophane or (d,l-delta-carboxy-dibenzyl-biotin)

13.2 grams of dried 3,4-(1',3'-dibenzyl-2'-keto-imidazolido)-1,2-trimethylene-thiophanium bromide are added with stirring to a solution of 1.38 grams of sodium in 300 cc. freshly distilled diethyl malonate. The reaction mixture is stirred at 140–150° C. for two hours. It is then cooled, and ethyl acetate and water are added, whereupon the precipitated sodium bromide dissolves. The organic and aqueous layers are separated, and the latter is extracted twice more with ethyl acetate. After drying the combined organic extracts with sodium sulfate, the solvents are distilled off in vacuo, first using a steam bath and then an oil bath at about 100° C. The oily orange colored residue, containing the diethyl ester of d,l-delta-carboxy-dibenzyl-biotin, is refluxed for 8–10 hours with 250 cc. of methanol, 80 cc. of water and 120 cc. of 50 per cent potassium hydroxide. The reaction mixture is concentrated in vacuo to about ⅛ of its original volume, and then about 1500 cc. of water are added. A slight precipitate is formed, which is extracted with ethyl acetate. This is a neutral by-product. The aqueous solution is acidified with hydrochloric acid, whereupon an oil precipitates which is extracted with ethyl acetate. After drying over sodium sulfate and distilling the solvent off in vacuo, a solid residue is obtained. This is d,l-delta-carboxy-dibenzyl-biotin. It can be recrystallized from a mixture of acetone, ether and petrol-ether, and melts then at 133–135° C. with decomposition (evolution of carbon dioxide).

Decarboxylation of d,l-delta-carboxy-dibenzyl-biotin to d,l-dibenzyl-biotin 12 grams of d,l-delta-carboxy-dibenzyl-biotin are refluxed for 10 minutes in 100 cc. of o-dichlorobenzene. The solvent is steam distilled and the brown residue extracted with ethyl acetate. The ethyl acetate solution is dried and concentrated in vacuo. The oily residue, weighing about 11.8 grams is dissolved in boiling benzene, the solution is treated with charcoal, and filtered. Ether and petrol-ether are then added to the filtrate. After standing for at least 24 hours, d,l-dibenzyl-biotin crystallizes out. The product, which is somewhat colored, is filtered off and washed with ether on the suction funnel, until the filtrate is colorless. M. P. 109–112° C. After several crystallizations from a mixture of acetone, ether and petrol-ether, the melting point is constant at 122–124° C.

Debenzylation of d,l-dibenzyl-biotin to d,l-monobenzyl-biotin 4.3 grams of crystalline d,l-dibenzyl-biotin are dissolved in 125 cc. of warm dry xylene, and placed in a 3-neck flask fitted with a mechanical stirrer and gas inlet and outlet tubes. An acetone-dry ice bath is provided. The solution is stirred and about 250 cc. of dry liquid ammonia are introduced. The acetone bath is removed and 1.15 grams of sodium are added in small portions during the course of five minutes. The blue color of the solution remains even when it is stirred for another half hour. Ammonium chloride is added to destroy the excess of sodium. After distilling off the ammonia, and adding water and ether, the reaction mixture is acidified to pH 1 with hydrochloric acid and cooled to about 5° C. The crystalline precipitate is filtered off. It melts at 165–172° C. Further purification is obtained by recrystallization from about 2 liters of boiling water. On standing, the product crystallizes out. It melts now at 175–176° C. and shows no melting point depression when mixed with a known sample of pure d,l-monobenzyl-biotin. The aqueous filtrate is extracted three times with chloroform, and the chloroform, after drying, is concentrated in vacuo. The residue consists likewise of d,l-monobenzyl-biotin.

l-3,4-(1',3'-dibenzyl-2'-keto-imidazolido)-1,2-trimethylene-thiophanium d-camphorsulfonate or (l-thiophanium d-camphorsulfonate)

36 grams of silver carbonate are treated with a solution of 58.1 grams of d-camphorsulfonic acid is 350 cc. distilled water. The solution of silver d-camphorsulfonate thus obtained is decanted from a small amount of undissolved silver carbonate, and is then added to a boiling solution of 111.4 grams of 3,4-(1′,3′-dibenzyl-2′-keto-imidazolido)-1,2-trimethylene-thiophanium bromide in 3 liters of distilled water. The precipitated silver-bromide is filtered off, the solution is concentrated in vacuo to dryness, and the dry residue is dissolved in 2100 cc. of boiling isopropanol. After standing at room temperature for 24 hours, the crystalline voluminous precipitate formed is filtered off. The yield is 61.2 grams = 82 per cent of a product having a specific optical rotation $[\alpha]_D^{25}$ of $-1.7 \pm 0.2°$. The material can be further purified by recrystallization from isopropanol. Needles melting at about 238–239° C. are obtained. The specific optical rotation of the pure material is $[\alpha]_D^{25} = -2.6°$. The dextrorotatory antipode is contained in the mother liquids.

A mixture of absolute alcohol and ether can also be employed for the separation of the l- and d-isomers. Thus 9.3 grams of the crude mixture of the d-camphorsulfonates is dissolved in 50 cc. of absolute alcohol. 70 cc. of ether are added, and the precipitated crystals are filtered after one hour. The material thus obtained is, however, slightly less pure; $[\alpha]_D^{25} = -0.4°$.

*l-3,4-(1′,3′-dibenzyl-2′-keto-imidazolido)-*
*2-(ω,ω-dicarboxy-butyl)-thiophane*

43.5 grams of l-3,4-(1′,3′-dibenzyl-2′-keto-imidazolido)-1,2-trimethylene-thiophanium d-camphor sulfate ($[\alpha]_D^{25} = -1.0°$ to $-2.6°$) and 60 cc. of toluene are added to a stirred warm (70° C.) solution of 5.05 grams of sodium in 80 grams of diethyl malonate. The mixture is refluxed for three hours, it is then cooled to room temperature, diluted with ether and washed with ice water to remove some dark impurities. The organic solution is concentrated in vacuo, and the oily residue is dissolved in 200 cc. of methanol. 300 cc. of a 50 per cent aqueous potassium hydroxide solution are added and the mixture is refluxed for five hours. The cooled solution is then diluted with water, acidified with concentrated hydrochloric acid and extracted with ethyl acetate. The ethyl acetate extract is concentrated in vacuo, and the crude oily reaction product is used for the next step. The product can be recrystallized from a mixture of acetone, ether and petrol-ether and forms prisms melting at 133–137° C. with decomposition. $[\alpha]_D^{25} = -4.4°$. ($c = 1.2$ per cent in 0.1 N sodium hydroxide).

*l-3,4-(1′,3′-dibenzyl-2′-keto-imidazolido)-*
*(ω-carboxybutyl)-thiophane or l-dibenzyl-biotin*

600 cc. of xylene are added to the crude oily l-3,4-(1′,3′-dibenzyl-2′-keto-imidazolido)-2-(ω,ω-dicarboxy-butyl)-thiophane (33–34 grams) obtained as described above. The mixture is refluxed until the initially undissolved product is completely decarboxylated, and the dibenzyl-biotin formed is completely dissolved (10–20 minutes). The solution is then heated for another 20 minutes, during which time about 200 cc. of the solvent is distilled off. The rest of the solvent is removed by vacuum distillation. The oily residue, representing crude dibenzyl-biotin, is used for the next step without further purification. It is very difficult to crystallize. The crude material has a negative specific rotation.

*3,4-(1′,3′-dibenzyl-2′-keto-imidazolido)-*
*2-hydroxy-2-(ω-ethoxy-butyl)-thiophane*
*or (in its open form) 1,3-dibenzyl-cis-4-*
*mercaptomethyl-2-(ω-ethoxyvaleryl)-imidazolidone-2*

A Grignard solution, prepared from 8.5 grams 4-ethoxy-butylbromide and an excess of magnesium (2.4 grams) in 15 cc. of ether and 5 cc. of benzene is diluted with benzene, decanted from the unreacted magnesium and added dropwise (in about 30 minutes) to a boiling, stirred solution of 13.5 grams of 3,4-(1′,3′-dibenzyl-2′-keto-imidazolido)-2-keto-thiophane (thiolactone) in 160 cc. of benzene. The solution is then kept refluxing for another 2½ hours. The mixture is decomposed with ice and dilute sulfuric acid, the organic layer is separated and concentrated in vacuo. The residue is dissolved in methanol and heated to 50° C. with an excess of aqueous sodium hydroxide solution. Ether and water are added, and the two layers are separated. The alkaline aqueous solution contains the unreacted thiolactone, which is extracted and recovered after acidification. The ether layer containing the reaction product is dried, and concentrated in vacuo. The residue is recrystallized from a mixture of acetone, ether, and petrol-ether, and forms thick plates melting at 115–115.5° C.

*3,4-(1′,3′-dibenzyl-2′-keto-imidazolido)-*
*2-(ω-ethoxy-butylidene)-thiophane*

A solution of 20.0 grams of 3,4-(1′,3′-dibenzyl-2′-keto-imidazolido)-2-hydroxy-2-(ω-ethoxy-butyl)-thiophane in 100 cc. acetic acid is refluxed for 1½ hours. The solution is concentrated in vacuo, the residue is dissolved in ether and the solution is washed with dilute sodium carbonate solution. The ether solution is dried and concentrated in vacuo. The oily residue represents the unsaturated ω-ethoxy-butylidene compound. The yield is quantitative. The product can be recrystallized from a mixture of ether and petrol-ether and forms crystals melting at 56–58° C.

*3,4-(1′,3′-dibenzyl-2′-keto-imidazolido)-*
*2-(ω-ethoxybutyl)-thiophane*

The 3,4-(1′,3′-dibenzyl-2′-keto-imidazolido)-2-(ω-ethoxy-butylidene)-thiophane (20 grams), obtained in the previous example, is dissolved in 150 cc. of methanol and hydrogenated in the presence of 20–40 grams of Raney nickel catalyst at room temperature and atmospheric pressure. The calculated amount of hydrogen is taken up in 30 hours. Palladium catalysts, as for example, palladium on charcoal, palladium on barium sulfate and palladium oxide, can also be used. The catalyst is filtered off and the solution is concentrated in vacuo. The hydrogenation product is used without further purification for the following reaction. It can be recrystallized from petrol-ether and forms thin plates melting at 84–85° C.

*3,4-(N-monobenzyl-2′-keto-imidazolido)-2-*
*(ω-ethoxybutyl)-thiophane*

A solution containing 7.1 grams of 3,4-(1′,3′-dibenzyl-2′-keto-imidazolido)-2-(ω-ethoxybutyl)-thiophane in 20–30 cc. xylene is added to 20–30 cc. liquid ammonia cooled in a Dry Ice bath. To the stirred mixture is added sodium (in form of small pieces) until a persisting blue color develops (about 0.78 gram sodium is used). The last excess of sodium is destroyed with ammonium chloride, the ammonia is evaporated, and dilute sulfuric acid and ether are added. The mixture is stirred for a while and then filtered. The bulk of the reaction product remains on the funnel; a smaller part is dissolved in the ether layer of the filtrate. The latter is separated (if some product precipitates, ethyl-acetate is added), dried and concentrated in vacuo. The residue is recrystallized from acetone-ether, together with the material obtained by filtration. The product can also be recrystallized from a mixture of acetone, ether and petrol-ether. Fine needles melting at 159–160.5° C. are obtained.

We claim:

1. The process of debenzylating an N-benzylated 3,4-(2'-keto-imidazolido)-thiophane which comprises reacting said compound with a hologen compound of the group consisting of hydrochloric acid, hydriodic acid, hydrobromic acid and aluminum chloride.

2. The process of debenzylating an N-benzylated 3,4-(2'-keto-imidazolido)-thiophane which comprises reacting said compound with a concentrated aqueous solution of hydrobromic acid.

3. The process of debenzylating an N-benzylated 3,4-(2'-keto-imidazolido)-thiophane which comprises reacting said compound with a concentrated aqueous hydrochloric acid.

4. The process of debenzylating an N-benzylated 3,4-(2'-keto-imidazolido)-thiophane which comprises reacting said compound with a concentrated aqueous solution of hydriodic acid.

5. The process which comprises reacting 3,4-(1',3'-dibenzyl-2'-keto - imidazolido)-2-($\omega,\omega$-dicarbalkoxy-butyl)-thiophane with a concentrated aqueous solution of hydrobromic acid to form biotin.

6. The process which comprises reacting l-3,4-(1',3'-dibenzyl-2'-keto - imidazolido)-2-($\omega,\omega$-dicarbethoxy-butyl) thiophane with a concentrated aqueous solution of hydrobromic acid to form d-biotin.

7. The process which comprises reacting 3,4-(1',3'-dibenzyl-2'-keto - imidazolido) - 1,2-trimethylene-thiophanium bromide with a concentrated aqueous solution of hydrobromic acid to form 3,4-(2'-keto-imidazolido)-1,2-trimethylene-thiophanium bromide.

8. The process which comprises reacting 3,4-(1',3'-dibenzyl-2'-keto - imidazolido)-2-($\omega$-ethoxypropyl) thiophane with a concentrated aqueous solution of hydrobromic acid to form 3,4-(2'-keto - imidazolido)-1-2-trimethylene - thiophanium bromide.

9. The compound 3,4-(2'-keto - imidazolido)-1,2-trimethylene-thiophanium bromide.

MOSES WOLF GOLDBERG.
LEO HENRYK STERNBACH.

No references cited.

Certificate of Correction

Patent No. 2,489,238                                November 22, 1949

MOSES WOLF GOLDBERG ET AL.

It is hereby certified that errors appear in the printed specification of the above numbered patent requiring correction as follows:

Column 3, Formula (III), for that portion reading

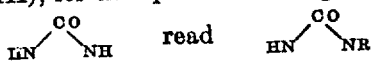

column 8, line 73, for "keto-thiophane" read *keto-thiophane*; column 9, lines 34 and 45, for "1'3'-dibenzyl" read *1'3'-dibenzyl*; column 11, line 34, after "imidazolido" insert a closing parenthesis; column 13, line 18, for "hologen" read *halogen*; column 14, line 23, for "1-2-trimethylene" read *1,2-trimethylene*;

and that the said Letters Patent should be read with these corrections therein that the same may conform to the record of the case in the Patent Office.

Signed and sealed this 28th day of March, A. D. 1950.

[SEAL]

THOMAS F. MURPHY,
*Assistant Commissioner of Patents.*